Sept. 9, 1952  B. I. BROWNING  2,610,095
RAIL CAR BEARING AND OILER
Filed Sept. 9, 1950  2 SHEETS—SHEET 1

Inventor
Bonny I. Browning
By Fishburn & Mullendore
Attorneys

Sept. 9, 1952          B. I. BROWNING          2,610,095

RAIL CAR BEARING AND OILER

Filed Sept. 9, 1950          2 SHEETS—SHEET 2

Inventor
Bonny I. Browning
By Fishburn & Mullendore
Attorneys

Patented Sept. 9, 1952

2,610,095

UNITED STATES PATENT OFFICE 2,610,095

RAIL CAR BEARING AND OILER

Bonny I. Browning, North Kansas City, Mo., assignor by decree of distribution to Clare Browning Application September 9, 1950, Serial No. 184,026

2 Claims. (Cl. 308—84)

This invention relates to a lubricating means for journal bearings, and more particularly to such means for lubricating the journals and journal boxes of railway cars and the like.

The objects of the invention are to provide a structure for supplying lubricating oil to journal bearings in response to operation of the journals in forward or reverse directions; to provide a lubricant supplying mechanism which is locatable in conventional journal bearing housings and operable to supply lubricant to the journal bearings with slight modification of the journals and bearings; to provide lubricating means of this character wherein the usual oil swab or packing is eliminated and the journal bearings maintained in lubricated condition when the railway car is being moved enabling a railway train of cars to proceed on its journey without danger from hot boxes and in this way avoid the numerous delays that are caused in the transportation of freight and passengers; to provide a lubricating oil pump and mounting therefor about the longitudinal axis of the railway car axle trunion with resilient means engaging the journal bearing housing for retaining the pump against rotative movement therein; to provide a pump operating member with a positive connection with the axle journal whereby rotation of the axle in either forward or reverse direction will operate the pump to supply a quantity of lubricating oil to the journal bearing; and to provide a device of this character which is of simple yet efficient construction, easily applied and removed to conventional journals, journal bearings and housings therefor to maintain the bearings in lubricated condition for trouble-free operation over long time and distance.

In accomplishing these and other objects of the present invention, I have provided improved details of structure, the preferred forms of which are illustrated in the accompanying drawings, wherein.

Figure 1:
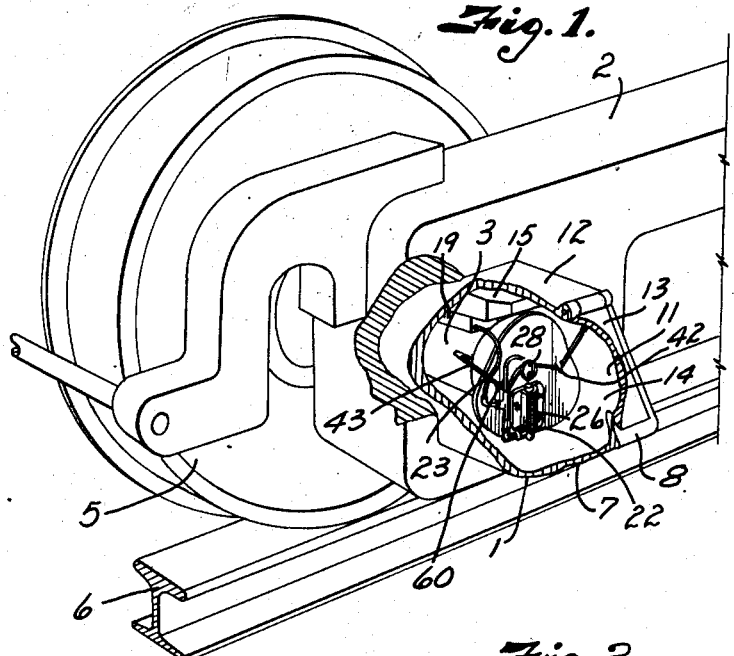
Fig. 1 is a perspective view of a railway car, journal and bearing housing, with portions broken away to illustrate the location of the pump and mounting thereof in said housing.
Figure 2:
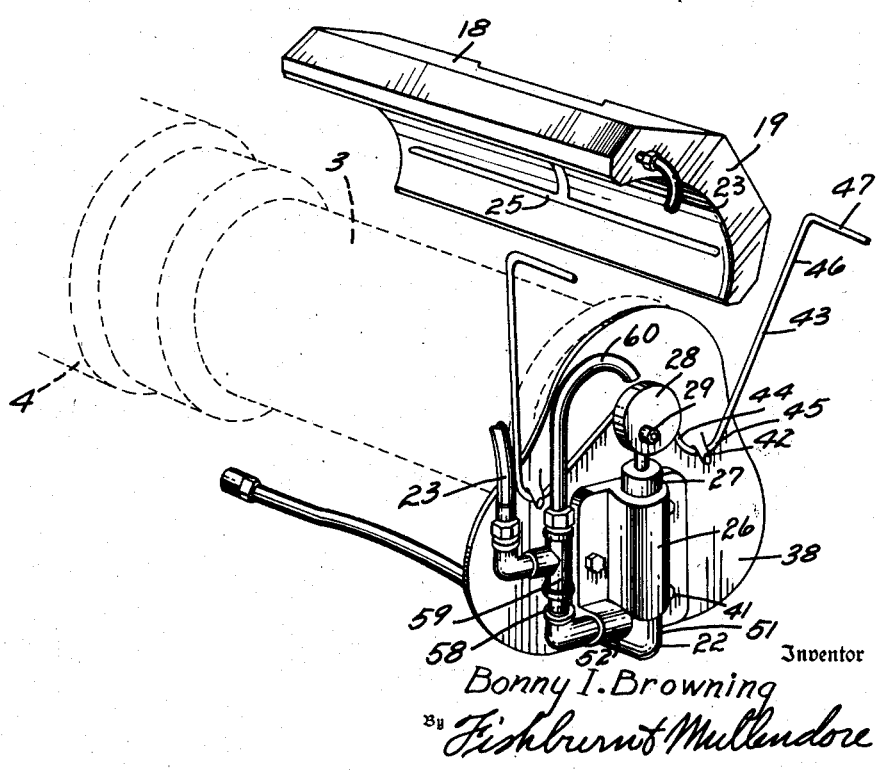
Fig. 2 is a detailed disassembled perspective view of the pump, pump mounting and bearing with the axle journal shown in broken lines.
Figure 3:
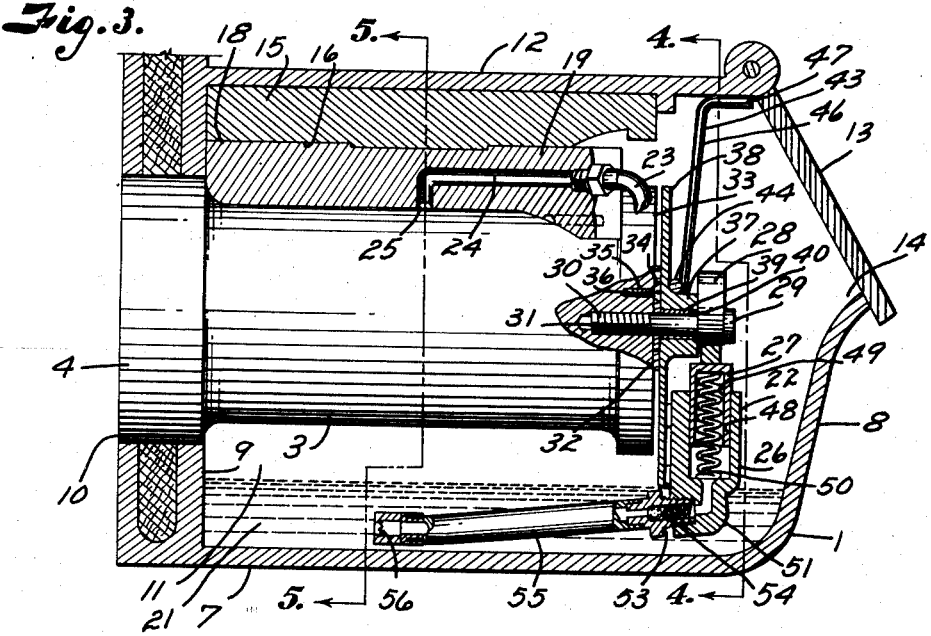
Fig. 3 is a longitudinal sectional view through the journal bearing housing showing the invention applied therein.

Referring more in detail to the drawings:

1 designates a substantially conventional form of journal bearing housing supported in the usual manner in a truck frame 2 of a railway car and adapted to receive the journal 3 of an axle 4 having a railway car wheel 5 suitably fixed thereon and adapted to rotate on conventional rails 6. The journal bearing housing includes a bottom 7, front wall 8 and a rear wall 9, said rear wall being provided with the usual journal opening 10 through which the journal 3 of the axle 4 extends. The journal bearing housing also includes side walls 11, top wall 12 and the usual hinged cover 13 which closes the inspection opening 14 in the upper portion of the front wall 8. The structure above described is well known and forms no part of the present invention.

Depending from the top wall 12 is a seat member 15, the lower face 16 of which is provided with suitably sloping walls 17 which receive and engage cooperating upper surfaces 18 of a journal bearing or brass 19 to retain said bearing in position relative to the housing 1. The bearing brass 19 is provided with a cylindrical recess 20 on its lower face substantially conforming to the bearing face of the trunnion 3 to provide a sliding bearing contact between the faces of the journal 3 and the bearing brass 19. The relative lengths of the journal 3 and bearing brass are such as to provide limited relative longitudinal movement as in conventional practice.

The lower portion of the housing 1 is adapted to contain a quantity of suitable lubricant, such as oil 21, and said oil is moved by a pump mechanism 22 from the lower part of the housing and discharged through a flexible duct 23 into a bored passage 24 in the bearing brass 19 which comunicates with oil grooves 25 in the bearing face 20 of said bearing brass, said oil grooves being suitably arranged to distribute the lubricant over the engaged faces of the trunnion 3 and bearing brass 19.

The pump mechanism 22 includes a cylinder 25 and a piston 27 which are operated by an eccentric or cam 28 secured to the trunnion 3 for rotation therewith. The eccentric 28 is preferably fixed adjacent the outer end of a spindle 29 which is fixed to the trunnion 3 in coaxial relationship therewith. The spindle 29 preferably has a threaded shank 30 which is screwed into a threaded bore 31 that extends inwardly from the end of the trunnion and coaxially therewith. The spindle is preferably provided with a radial flange 32 which engages the outer face 33 of the trunnion when the shank 30 is screwed into the threaded bore 31. The flange 32 is preferably provided with a plurality of countersunk apertures 34 whereby when the flange 32 is drawn against the outer face 33 of the trunnion, one of the apertures will align with a threaded bore 35 spaced from the threaded bore 31 whereby a screw 36 is inserted through the aperture 34 and screwed into the bore 35 to rigidly fix the spindle 29 to the trunnion 3. The eccentric 28 is spaced from the flange 32 sufficiently to locate a bearing boss 37 of a pump mounting place 38 therebetween and the bearing boss is provided with a bore 39 mounting a suitable bushing or other bearing 40 which is rotatably mounted on the spindle 29. The boss 37 and plate 38 are so arranged whereby the plate is adjacent to the flange 32.

Figure 4:
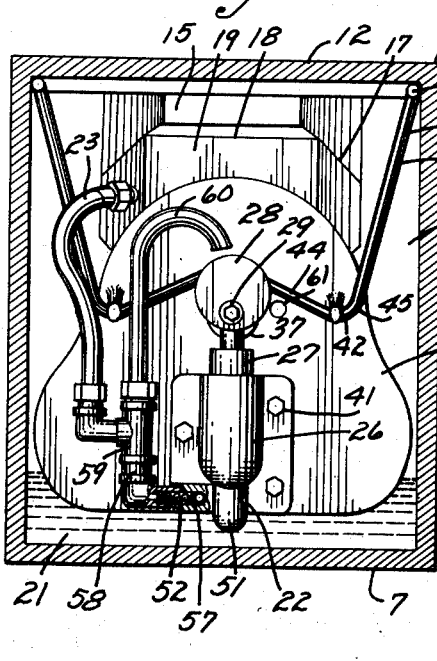
Fig. 4 is a transverse sectional view through the journal bearing housing on the line 4—4, Fig. 3.
Figure 5:
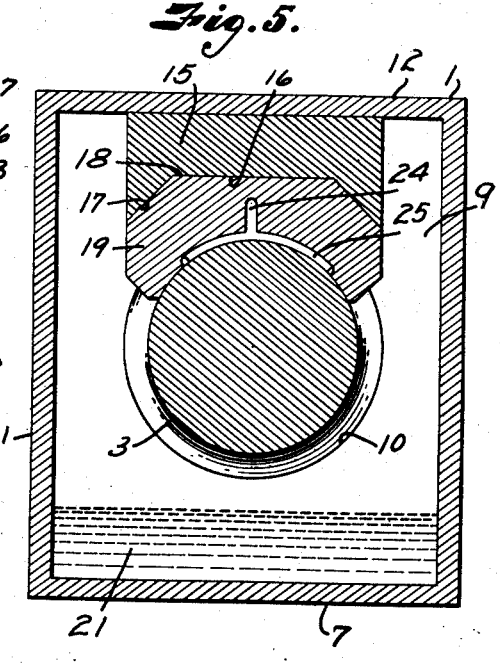
Fig. 5 is a transverse sectional view through the journal bearing housing on the line 5—5, Fig. 3.

The plate 38 extends downwardly from the boss 37, as illustrated in Fig. 4, and the cylinder 26 of the pump mechanism is secured thereto by suitable fastening devices such as screws 41. The plate 38 is preferably retained against rotation or lateral movement relative to the housing 1, however, since the trunnion 3 normally moves longitudinally of the housing when the railway car is negotiating curves and the like, the plate and pump thereon should float to a limited extent relative to said housing 1. Therefore, the plate preferably has a resilient connection with the housing. In the illustrated arrangement the plate has spaced lugs 42 extending outwardly therefrom on opposite sides of the boss 37, said lugs cooperating with the boss to receive a heavy spring 43 preferably substantially in the shape of a W whereby the mid portion 44 extends over the boss 37 and intermediate portions 45 extend under the lugs 42 with the legs 46 extending upwardly and laterally with the ends thereof engaging the housing 1 adjacent the upper ends of the side walls 11. Outwardly turned ends 47 are preferably provided on the ends of the legs 46 to increase the bearing area between the spring and the housing 1.

The pump cylinder 26 has a bore 48 open at its upper end and having its axis in vertical alignment with the spindle 39. The piston 27 is reciprocable in the bore 48 and has a socket 49 extending therein for receiving a spring 50 which has its ends respectively engaged with the inner end of the bore of the cylinder and socket in the piston to exert a force on the piston tending to move same upwardly relative to the cylinder 26 and maintain engagement of the upper closed end of said piston with the peripheral face of the eccentric 28 whereby rotation of the eccentric effects reciprocation of the piston in the cylinder boss. The lower end of the cylinder 26 is provided with bosses 51 and 52 having passages therein forming intake and outlet ports respectively of the pump. Mounted in the boss 51 and having communication with the passage therein is a fitting 53 in which is located a spring-actuated intake valve 54. Connected to the fitting is one end of a flexible duct 55 which extends downwardly and rearwardly in the housing 1 whereby the other end of the flexible duct is always below the level of the oil in the housing. A strainer 56 is mounted on the other end of the flexible duct whereby lubricating oil drawn through the duct 55, intake valve 54, and into the cylinder bore 48 is free of dirt, grit and the like.

The boss 52 is provided with a spring-actuated discharge valve 57 which cooperates with the intake valve 54 whereby upward movement of the piston relative to the cylinder draws lubricating oil into said cylinder and downward movement of the piston relative to the cylinder forces the oil from the cylinder through the discharge port and into a discharge duct 58 connected therewith. The discharge duct 58 preferably includes a T-fitting 59 having one branch communicating with a flow tube 60 having a relatively small bore or orifice whereby a small quantity of lubricating oil is moved therethrough and discharged immediately above the eccentric 28. The principal portion of the lubricating oil discharged from the pump mechanism is moved through another branch of the T-fitting and through the flexible duct 23 connected therewith for delivery to the oil grooves in the bearing brass 19.

The pump mechanism, including the intake and discharge valves and ducts, is all assembled and mounted on the plate 38 by means of suitably fastening devices such as screws 41. The spindle 29 is inserted through the bearing 40 and the eccentric secured to the outer end of said spindle. The entire mechanism is then ready for mounting in a trunnion bearing housing such as is used on conventional railway cars. The only alterations necessary in present equipment are the provision of the threaded bores 31 and 35 in the end of the trunnion 3 and the drilling and grooving of the bearing brasses 19. The trunnions and bearing brasses need be modified only in that manner. The cover 13 on the bearing housing 1 may be lifted and the plate 38 with the pump mechanism mounted thereon inserted through the opening 14 and arranged whereby the threaded shank 30 aligns with the threaded bore 31 in the trunnion. Then by turning the spindle 29 the shank 30 is screwed into the threaded bore 31 until the flange 32 tightly engages the end of the trunnion.

The railway car wheels and axle are rotated to rotate the trunnion relative to the plate 38 until the threaded bore 35 aligns with an aperture 61 in the plate 38. The spindle is then rotated until an aperture 34 in the flange 32 aligns with the bore 35 and the screw 36 is inserted through the aperture 61 and threaded into the bore 35 to secure the flange 32 to the trunnion and prevent relative rotation of the spindle 29 and trunnion 3. The spring 43 is then applied to the plate with the center portion over boss 37. The intermediate portions 45 are sprung downwardly until they pass under the lugs 42 and then said spring is released whereby the ends 47 on the legs 46 engage the side walls 11 of the housing 1. This resiliently centers the pumping mechanism in the housing 1. The flexible duct 23 is then connected to the bearing brass whereby the discharge from the flexible duct is delivered into the passage 24 in the bearing brass 19. A suitable quantity of oil is then placed in the housing 1. With the mechanism assembled as described, movement of the railway car in either direction rotates the wheels and axle. The rotation of the axle also rotates the eccentric 28 to effect reciprocation of the piston 27 in the cylinder 26, drawing oil through the strainer 56, flexible duct 55, intake valve 54 and discharging the lubricating oil through the discharge valve 57, connection 58, and T-fitting 59, whereby a portion of the oil is delivered through the tube 60 onto the eccentric to lubricate same and the principal portion of the oil pumped is delivered through the flexible duct 23, passage 24 and oil grooves 25 to distribute said oil over the engaged surfaces of the bearing brass and trunnion.

The particular arrangement of the valves at the lower end of the pumping mechanism and also adjacent the bottom of the housing 1 eliminates any necessity of ever having to prime the pump once it is in operation. This arrangement provides a positive supply of lubricant to the journal bearing during any transportation of the railway car equipped with the mechanism described and eliminates the hot boxes and other disadvantages which are characteristic of the old oil swab and packing that have been used in the past.

It is believed obvious that I have provided a lubricating means for journal bearings which is economical to manufacture, easily installed and maintained and efficient in operation to maintain the journal bearings in lubricated condition.

What I claim and desire to secure by Letters Patent is:

1. In a rail car journal bearing having a housing supported on the truck frame of the car, said housing being adapted to contain a quantity of lubricating oil in the bottom thereof, said housing having a journal opening at one end thereof, a journal extending through the journal opening and into the housing, a bearing block having an arcuate lower face engaging the journal and having limited longitudinal movement relative to the journal, said bearing block having oil grooves in the arcuate lower face and an oil passage extending from the exterior thereof and connecting with the oil grooves, a seat member resting on the bearing block and having engagement with the upper portion of the housing for supporting the proportionate weight of the railroad car on the bearing blocks and journal, a spindle fixed to the end of the journal in the housing and extending therefrom in axial relation thereof, a pump cylinder having valved intake and outlet ports, means on the cylinder and rotatably mounted on the spindle whereby the axis of the cylinder is radially of the spindle, a piston reciprocable in the cylinder and extending therefrom toward the spindle, resilient means having engagement with the housing and the means on the cylinder for substantially preventing relative rotation between the cylinder and housing yet permitting the cylinder to move with the journal longitudinally of the housing, an intake duct extending into the lubricating oil in the bottom of the housing and having connection with the valved intake port of the cylinder, a flexible discharge duct connecting the valved outlet port of the cylinder and oil passage of the bearing block for delivering oil from the cylinder to the journal bearing, and an eccentric fixed on the spindle and engaging the piston for reciprocating the piston and pumping oil from the bottom of the housing and supplying said oil under pressure to the journal bearing in response to rotation of the journal in the housing.

2. In a rail car journal bearing having a housing supported on the truck frame of the car, said housing being adapted to contain a quantity of lubricating oil in the bottom thereof, said housing having a journal opening at one end thereof, a journal extending through the journal opening and into the housing, a bearing block having an arcuate lower face engaging the journal and having limited longitudinal movement relative to the journal, said bearing block having oil grooves in the arcuate lower face and an oil passage extending from the exterior thereof and connecting with the oil grooves, a seat member resting on the bearing block and having engagement with the upper portion of the housing for supporting the proportionate weight of the railroad car on the bearing block and journal, said journal having an axial threaded bore extending therein from the end thereof in the housing, a spindle having a threaded shank screwed into the threaded bore, said spindle extending from the journal in axial relation thereto, means engaging the spindle and journal for preventing relative rotation thereof, a pump cylinder having valved intake and outlet ports, a plate fixed to the cylinder and having a bearing portion rotatably mounted on the spindle whereby the axis of the cylinder is radially of the spindle, a piston reciprocable in the cylinder and extending therefrom toward the spindle, lugs on the plate at opposite sides of the bearing portion and spaced therefrom, resilient means engaging the bearing portion and lugs on the plate fixed to the cylinder and having upwardly and outwardly extending arms resiliently engaging opposite sides of the housing for substantially preventing relative rotation between the cylinder and housing yet permitting the cylinder to move with the journal longitudinally of the housing, an intake duct extending into the lubricating oil in the bottom of the housing and having connection with the valved intake port of the cylinder, a flexible discharge duct connecting the valved outlet port of the cylinder and oil passage of the bearing block for delivering oil from the cylinder to the journal bearing, and an eccentric fixed on the spindle and engaging the piston for reciprocating the piston and pumping oil from the bottom of the housing and supplying said oil under pressure to the journal bearing in response to rotation of the journal in the housing.

BONNY I. BROWNING.

REFERENCES CITED

The following references are of record in the file of this patent:

UNITED STATES PATENTS

| Number | Name | Date |
| --- | --- | --- |
| 864,778 | Gamage | Sept. 3, 1907 |
| 1,213,747 | Clehm | Jan. 23, 1917 |